(12) United States Patent
Yoneya et al.

(10) Patent No.: US 11,313,300 B2
(45) Date of Patent: Apr. 26, 2022

(54) DEVICE AND METHOD FOR CONTROLLING THE START OF AN INTERNAL COMBUSTION ENGINE

(71) Applicant: Hitachi Astemo, Ltd., Hitachinaka (JP)

(72) Inventors: Naoki Yoneya, Tokyo (JP); Masayuki Saruwatari, Hitachinaka (JP)

(73) Assignee: Hitachi Astemo, Ltd., Hitachinaka (JP)

(*) Notice: Subject to any disclaimer, the term of this patent is extended or adjusted under 35 U.S.C. 154(b) by 0 days.

(21) Appl. No.: 17/422,625

(22) PCT Filed: Dec. 24, 2019

(86) PCT No.: PCT/JP2019/050658
§ 371 (c)(1),
(2) Date: Jul. 13, 2021

(87) PCT Pub. No.: WO2020/158263
PCT Pub. Date: Aug. 6, 2020

(65) Prior Publication Data
US 2022/0090552 A1    Mar. 24, 2022

(30) Foreign Application Priority Data
Feb. 1, 2019   (DE) .................... 10 2019 201 344.9

(51) Int. Cl.
*F02D 41/00*    (2006.01)
*F02D 41/06*    (2006.01)
(Continued)

(52) U.S. Cl.
CPC ............ *F02D 41/062* (2013.01); *F02B 19/12* (2013.01); *F02B 19/18* (2013.01); *F02D 41/402* (2013.01); *F02N 19/02* (2013.01); *F02P 5/1506* (2013.01)

(58) Field of Classification Search
CPC ...... F02D 41/062; F02D 41/402; F02B 19/12; F02B 19/18; F02N 19/02; F02P 5/1506
See application file for complete search history.

(56) References Cited

U.S. PATENT DOCUMENTS 10,598,079 B2 *   3/2020   Anderson ............... F02B 19/00
10,619,556 B2 *   4/2020   Vattaneo ................. F02P 13/00
(Continued)

FOREIGN PATENT DOCUMENTS

JP      2006-144725 A    6/2006
JP      2007-71083 A     3/2007

OTHER PUBLICATIONS

International Search Report (PCT/ISA/210) issued in PCT Application No. PCT/JP2019/050658 dated Mar. 3, 2020 (three (3) pages).

(Continued)

*Primary Examiner* — Sizo B Vilakazi
*Assistant Examiner* — Sherman D Manley
(74) *Attorney, Agent, or Firm* — Crowell & Moring LLP

(57) ABSTRACT

The present invention relates to a device and a method for controlling the start of an internal combustion engine, wherein the internal combustion engine is equipped with an ignition device comprising a fuel-fed prechamber to ignite an air-fuel mixture in a main combustion chamber. In order to reduce the emissions of the internal combustion engine during engine start a prechamber heating operations is performed by injecting a predetermined amount of fuel into the prechamber and igniting an air-fuel-mixture therein, while the main fuel injector is deactivated during at least a first engine cycle after engine start request.

16 Claims, 2 Drawing Sheets

(51) Int. Cl.
*F02B 19/12* (2006.01)
*F02P 5/15* (2006.01)
*F02B 19/18* (2006.01)
*F02N 19/02* (2010.01)
*F02D 41/40* (2006.01)

(56) References Cited

U.S. PATENT DOCUMENTS

| | | | |
|---|---|---|---|
| 10,947,948 B1* | 3/2021 | Glugla | F02P 15/02 |
| 11,073,097 B1* | 7/2021 | Glugla | F02N 99/006 |
| 11,085,402 B1* | 8/2021 | Vroman | F02P 5/1502 |
| 11,118,497 B2* | 9/2021 | Glugla | F02D 13/0215 |
| 2012/0103302 A1* | 5/2012 | Attard | F02B 19/10 |
| | | | 123/260 |
| 2012/0318227 A1 | 12/2012 | Hashimoto et al. | |
| 2013/0025568 A1 | 1/2013 | Yokoyama et al. | |
| 2014/0209057 A1* | 7/2014 | Pouring | F02B 19/1023 |
| | | | 123/257 |
| 2015/0068489 A1* | 3/2015 | Bunce | F02B 19/108 |
| | | | 123/262 |
| 2017/0122184 A1* | 5/2017 | Hampson | F02D 37/02 |
| 2017/0314456 A1* | 11/2017 | Blaxill | F02B 19/12 |
| 2018/0010536 A1* | 1/2018 | Blaxill | F02N 19/06 |

OTHER PUBLICATIONS

Written Opinion (PCT/ISA/237) issued in PCT Application No. PCT/JP2019/050658 dated Mar. 3, 2020 (four (4) pages).

* cited by examiner

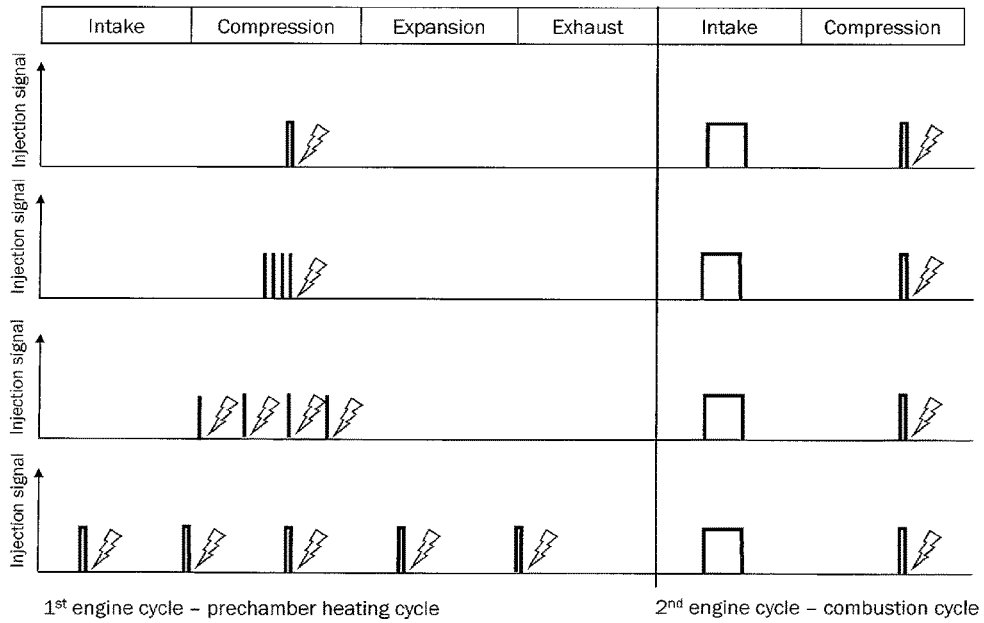
Figure 3a
Figure 3b
Figure 3c
Figure 3d
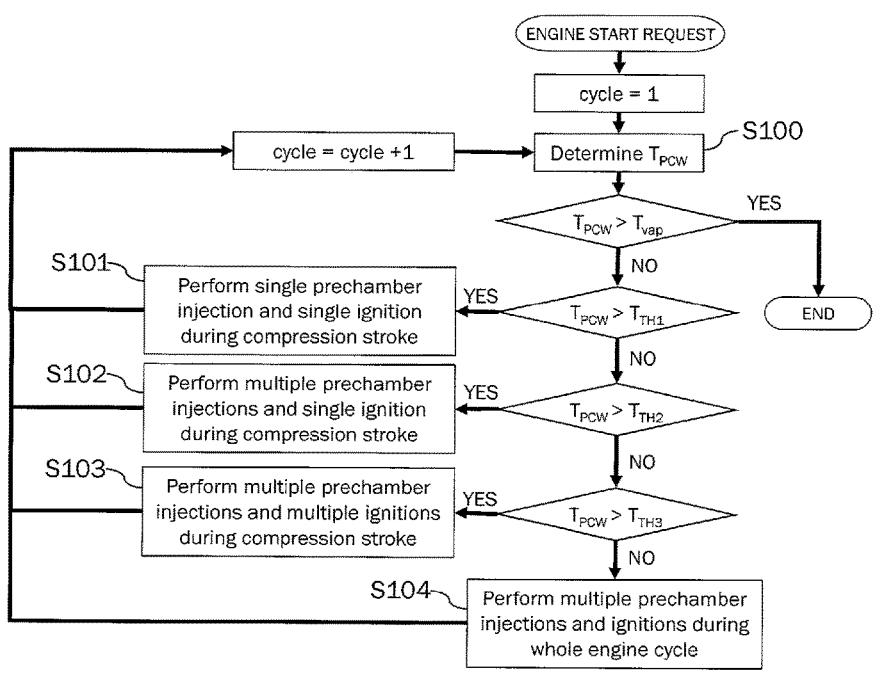
Figure 4

DEVICE AND METHOD FOR CONTROLLING THE START OF AN INTERNAL COMBUSTION ENGINE

TECHNICAL FIELD

The present invention relates to a control unit and a method for controlling the start of an internal combustion engine in order to reduce the cold-start emissions, in particular the particle emissions, wherein the internal combustion engine is equipped with an ignition device comprising a fuel-fed prechamber to ignite an air-fuel mixture in a main combustion chamber.

BACKGROUND ART

In order to improve the combustion efficiency of an internal combustion engine without drawbacks regarding nitrogen oxide emissions, it is beneficial to combust a very lean air-fuel mixture with an air-fuel ratio $\lambda > 2$. To ensure a stable ignition and combustion of such an extremely lean mixture, the usage of an ignition device having a fuel-fed prechamber is advantageous. The high ignition energy of such an ignition device is provided by a precombustion taking place in the prechamber. This precombustion is initiated by injecting a small amount of fuel into the prechamber and igniting the resulting air-fuel mixture therein. Since the prechamber is connected to the main combustion chamber via multiple small orifices, the combustion inside the prechamber results in multiple reactive jets, which enter from the prechamber into the main combustion chamber and ignite the air-fuel mixture therein. These reactive jets usually capture the entire main combustion chamber so that a plurality of ignition spots is provided which enables a secure flammability of the lean air-fuel mixture.

However, during engine start a prechamber ignition device can cause disadvantages regarding starting performance and emissions since low temperature leads to adverse ignition and combustion conditions inside the prechamber. At engine start, when the engine has a temperature below operating temperature, the fuel injected into the prechamber cannot evaporate properly but accumulates on the prechamber wall (wall wetting). As a result, an incomplete prechamber combustion takes place and the re-activity of the jets is not sufficient to ignite the air-fuel mixture in the main combustion chamber completely. Consequently, the engine either does not start at all or at least produces a high amount of hydrocarbon and particle emissions. Furthermore, the wall wetting inside the prechamber can lead to fuel deposits therein which may also cause particle emissions. A high amount of particles at engine start can result in severe problems regarding real driving emissions (RDE) and cold emission tests at −7° C. Especially in hybrid vehicles, at which the internal combustion engine is switched on and off multiple times during the vehicle operation, the particle emissions at engine start play an important role.

CITATION LIST

Patent Literature

PTL 1: Patent Literature 1: US 2018/010536 A1

SUMMARY OF INVENTION

Technical Problem

Patent Literature 1 describes a method for starting an internal combustion engine comprising an ignition device having a fuel-fed prechamber by preheating the ladder prior to injecting fuel in the main combustion chamber. The preheating includes injecting fuel into the prechamber and igniting the air-fuel mixture therein before fuel is injected into the main combustion chamber. However, said prechamber preheating is realized prior to a compression move of a piston or prior to a movement of a crank shaft. Consequently, the preheating prechamber combustion has to be executed at poor combustion conditions, since pressure and temperature in the prechamber are low at that time. Therefore, it is likely that the heating effect of such a prechamber combustion is not strong enough for reducing undesirable hydrocarbon and particle emissions at engine start properly.

Hence, the technical problem of the present invention is decreasing the cold-start emissions, in particular the particle emissions, of an internal combustion engine comprising an ignition device having a fuel-fed prechamber. The above-described technical problem is solved by the subject-matter according to the independent claims. Further preferred developments are described by the dependent claims.

Solution to Problem

The herein described and claimed subject-matter especially relates to at least one control unit and a method for controlling the start of an internal combustion engine (or shortly "engine"), wherein the internal combustion engine may have at least one cylinder, at least one main combustion chamber, at least one intake port, at least one main fuel injector and/or at least one ignition device configured to ignite an air-fuel-mixture inside the main combustion chamber, wherein the ignition device may comprise a spark plug, a prechamber fuel injector and a prechamber, which may be divided off from the main combustion chamber and may be connected in fluid terms to the main combustion chamber via at least one orifice in a prechamber wall. The at least one control unit may control the ignition device to perform a prechamber heating operation by injecting a predetermined amount of fuel into the prechamber and igniting an air-fuel-mixture therein, while the main fuel injector is deactivated during at least a first engine cycle after engine start request.

In other words, at least two engine revolutions are provided during which the prechamber heating operation can be carried out before the main combustion is initiated. Therefore, there is sufficient time for evaporating the injected predetermined amount of fuel and mixing it with the drawn-in air inside the prechamber which leads to a homogenous air-fuel mixture therein. A homogenous air-fuel mixture improves the ignitability of the prechamber load and reduces formation of particle emissions due to rich zones inside the mixture. Furthermore, reserving a complete engine cycle for the prechamber heating operation offers a high flexibility choosing an optimum timing for the prechamber combustion.

Preferably, the at least one main fuel injector of the engine is disposed so that the fuel is injectable directly into the main combustion chamber. Alternatively or in addition, the at least one main fuel injector can be arranged so that the fuel is injected into the intake port. In this case, it may be preferable to have at least one intake port per cylinder. In case the fuel is injected into the intake port or the combustion chamber with an injection pressure above 15 bar, the main fuel injector may be designed as a high-pressure fuel injector, for example as an electrohydraulic or a piezoelectric fuel injector. In case the fuel is injected into the intake port or the combustion chamber with an injection pressure below 15 bar, the main fuel injector may be designed as a low-pressure fuel injector. The fuel injected by the main fuel injector may be every kind of fuel suitable for a spark ignited combustion process, such as gasoline, ethanol, CNG, LPG, Hydrogen, Dimethyl carbonate, and so on. The internal combustion engine may preferably be a gasoline or a gas engine.

The prechamber of the ignition device may be designed, for example, in hemispherical shape, in conical shape or in cylindrical shape. Combinations of hemispherical shape with cylindrical or conical or any other suitable shape may be also possible. Preferably, a prechamber of cylindrical shape may be used, wherein the cylindrical diameter may be narrowed along a longitudinal direction of the prechamber. This may allow for providing enough space in the upper part of the prechamber to introduce the spark and the fuel without enlarging the volume of the prechamber more than necessary.

The larger the volume of the prechamber the higher the ignition energy provided to ignite the air-fuel mixture in the main combustion chamber. On the other hand, a high prechamber volume lowers the compression ratio of the engine by increasing a compression volume of a total combustion chamber, since at least parts of the prechamber should be integrated in the cylinder heat to avoid undesirable glow ignitions, which can occur when the prechamber protrudes too far into the main combustion chamber. Therefore, the prechamber volume should be chosen in a range providing the best compromise regarding the different requirements explained above. Preferably, the prechamber volume may be in the range of 1% to 5% of the main combustion chamber compression volume and most preferable in the range of 2% to 4% of the main combustion chamber compression volume.

The prechamber may have at least one orifice for providing fluid communication between the prechamber and the main combustion chamber. Preferably, multiple orifices may be disposed in the prechamber wall. Number, orientation and geometry of these orifices can have a great influence on the formation of the reactive jets and their distribution in the main combustion chamber.

Preferably, the prechamber may have multiple side orifices arranged in circumferential direction having a certain angle to a longitudinal axis of the prechamber. The number of the side orifices may preferably be in a range of 2 to 10 and most preferable in a range of 4 to 8 The angle between a middle axis of the side orifices and the longitudinal axis of the prechamber may preferably in a range of 10° to 90° and most preferable in a range of 20° to 70°

The side orifices may preferably be distributed equidistant to each other. Alternatively, depending on the geometry of the main combustion chamber, the side orifices may be arranged at various distances to each other, for example in two groups which are arranged symmetrically to a transversal axis of the prechamber.

Additionally, but not necessarily, the prechamber may have a central upward orifice to further improve the introduction of fresh mixture or fresh air into the prechamber which usually takes place during a compression cycle of the internal combustion engine.

The orifices are so small that flame quenching of the prechamber combustion occurs therein, so that only combustion products exit out of the prechamber into the main combustion chamber. The smaller an orifice diameter the higher the pressure inside the prechamber and the higher a velocity of the reactive jets for the same number of orifices. Regarding the preheating of the prechamber a larger orifice diameter can be beneficial to avoid wall heat losses caused by the increased pressure inside the prechamber when using smaller orifices. The diameter of the orifices may preferably be in a range of 0.8 mm to 3 mm and most preferable in a range of 0.9 mm to 1.6 mm.

The spark plug as well as the prechamber fuel injector, or at least parts thereof, are connected to the inside of the prechamber so that a spark and the fuel can be introduced/injected into the prechamber. It may also be possible that the ignition device comprises more than one spark plug, more than one prechamber fuel injector and more than one prechamber. Furthermore, the internal combustion engine may have one or more ignition devices.

Preferably, the spark plug is electrically connected to an ignition coil which provides high voltage to initiate the spark ignition in the prechamber. The ignition coil may be integrated into the ignition device or may be positioned remote to the ladder. The spark plug and the ignition coil form the spark ignition device which preferably offers a variable spark duration and multi-spark ignition.

The prechamber fuel injector may preferably be designed as a high-pressure fuel injector, particularly if liquid fuel is injected into the prechamber, in order to improve the fuel atomization. In this case, the prechamber fuel injector may be designed as an electrohydraulic or a piezoelectric fuel injector. Alternatively or in addition, a low-pressure fuel injector may be incorporated into the ignition device.

The fuel injected into the prechamber may be of the same type or a different type of fuel as used for a main fuel injection. Especially in view of a preheating of the prechamber, a more ignitable fuel may be beneficial to initiate the prechamber combustion even under difficult ignition conditions.

The predetermined amount of fuel injected into the prechamber depends on the amount of air available inside the prechamber. Since the air-fuel ratio of the prechamber mixture suitable for the prechamber heating operation may preferably be in a range of $0.85<\lambda<1$, the related predetermined amount of fuel results from the available air mass inside the prechamber, which mainly depends on the prechamber volume and the cylinder pressure. The prechamber volume is a constant value which may be determined once according to the size of the compression volume of the main combustion chamber. The cylinder pressure may preferably be measured with a cylinder pressure sensor. Alternatively or in addition, the cylinder pressure during the prechamber heating operation can be estimated based on calculations carried out in the control unit for example depending on intake pressure and engine speed. Hence, the predetermined amount of fuel injected into the prechamber can be determined with high accuracy.

The at least one control unit may be integrated into the combustion engine or, alternatively, it may be disposed at a position within a vehicle remote to the combustion engine, and the control unit and the engine may be connected via one or more signal lines. The control unit may be the engine control unit (ECU) or a separate control device. There may also be a plurality of control units which may control subgroups of the controlled actuators, e.g. one control unit may control only the main fuel injectors, another control unit may control only the ignition devices and so on.

Preferably, the control unit may control the ignition device to perform the prechamber heating operation during a compression stroke of the at least first engine cycle after engine start request, wherein the main fuel injector is deactivated during the entire engine cycle(s) in which the prechamber heating operation takes place. The control unit may be configured to control the ignition device to perform the prechamber heating operation by activating the prechamber fuel injector to inject the predetermined amount of fuel into the prechamber and subsequently triggering the spark plug to ignite the air-fuel-mixture therein As mentioned before, reserving a whole engine cycle for performing the prechamber heating operation allows to choose the optimum timing for the preheating process. Looking at the different engine strokes, the compression stroke can provide the best pressure and temperature conditions for performing the prechamber heating operation. Even if only a limited time for mixture formation can be provided during the compression stroke, the constantly rise of pressure and temperature lead to a significantly reduced time needed to create an ignitable mixture inside the prechamber. In total the advantages of the increasing pressure and temperature clearly overcompensate the time restriction in terms of mixture formation. Furthermore, the increased pressure and temperature at the end of the compression stroke accelerate the following combustion process and therefore, increase a heat release inside the prechamber. Hence, the injected fuel amount for achieving the desired temperature rise in the prechamber can be reduced. Summarizing, performing the prechamber heating operation during the compression stroke leads to a reliable ignition and an efficient combustion of the prechamber load and therefore increases the temperature of the prechamber effectively Further, the control unit may control the ignition device to perform multiple prechamber heating operations during at least the first engine cycle after engine start request until the temperature of the prechamber wall exceeds a predetermined temperature. Especially at low engine temperature a single prechamber heating operation might not be enough to heat up the prechamber properly. In such case further heating operations can be carried out during the first engine cycle, preferably during the compression stroke. For example, if a first heating operation took place at the beginning of the compression stroke, a further heating operation can be initiated at the end of the compression stroke. Due to the upward movement of the piston after the first prechamber combustion, fresh air can be introduced into the prechamber, so that an ignitable air-fuel mixture can be generated more than ones.

The temperature of the prechamber wall can be a used as reference temperature to decide whether the prechamber is sufficiently heated up to initiate the first main combustion. The wall temperature should have reached a value that allows for fast vaporization of the wall film, in order to avoid particle emissions caused by fuel deposits in the prechamber. Furthermore, the temperature in the prechamber should be appropriate for an effective precombustion to generate reactive jets which allow to completely ignite and combust the mixture in the main combustion chamber even at low engine temperature. A threshold value of the prechamber wall temperature which has to be exceeded to finish the prechamber heating operations may depend on the type of fuel to be injected into the prechamber. In case of gasoline, the prechamber wall temperature may preferably be 85° C. and most preferable 90° C. Preferably, the wall temperature of the prechamber may be measured with a temperature sensor which is permanently applied on the prechamber wall. Alternatively, the temperature sensor may only be applied during a testing phase in which the prechamber heating operations are carried out at all relevant boundary conditions. During the testing phase the rise of the prechamber wall temperature depending on the prechamber combustion can be measured by the temperature sensor, for example, at different engine temperatures, different air-fuel ratios in the prechamber, different injection pressures of the fuel injected into the prechamber and so on. The measured temperature rise of the prechamber wall can then be stored in the control unit as characteristic curves or maps depending on parameters which are continuously measured or calculated by the control unit, such as intake air temperature, engine coolant temperature, intake air mass and intake pressure. Alternatively or in addition, a pressure sensor may be applied in the prechamber, for example, using a measuring spark plug which includes a pressure sensor next to the central electrode. Measuring the pressure rise in the prechamber may allow for estimating the heat release therein and thus providing a good correlation to the temperature rise of the wall temperature.

In case the prechamber wall temperature does not achieve the predetermined wall temperature after a first prechamber heating operation cycle, the control unit may control the ignition device to perform the prechamber heating operations during multiple engine cycles after engine start request until the wall temperature of the prechamber exceeds the predetermined temperature. In this case, the above described procedures may also be carried out, namely to perform multiple fuel injections into the prechamber combined with one or multiple ignitions per prechamber heating operation and/or multiple prechamber heating operations per engine cycle. The maximum number of prechamber heating operation cycles may preferably be 5 cycles and most preferable 3 cycles, in order to avoid an undesirable long starting time of the internal combustion engine. In case of the hybrid vehicles, where the other powertrain such as an electric motor can operate the vehicle during the prechamber heating operation cycles, the maximum number of prechamber heating operation cycles can be extended more than 5 times, until the wall temperature of the prechamber exceeds the predetermined temperature. The total amount of fuel injected into the prechamber may be reduced stepwise after every prechamber heating operation cycle since unburned fuel of the previous cycle may remain in the prechamber. Furthermore, due to the higher prechamber temperature in a second or third heating operation cycle, less fuel is required to perform an effective combustion anyway. Performing multiple prechamber heating operation cycles allows for providing high reactive jets to reliably ignite the mixture in the main combustion chamber in the first main combustion cycle. Therefore, the formation of undesirable hydrocarbon and particle emissions is reduced during the engine start even at low engine temperature.

Furthermore, the control unit may split the predetermined amount of fuel to be injected into the prechamber and may control the prechamber fuel injector to inject it over a plurality of multiple injections. These multiple injections may be beneficial to support the mixture formation particularly at low engine temperature. Furthermore, the penetration of the spray into the prechamber can be reduces and therefore particles generated as a result of wall wetting can be decreased. The multiple injections may be carried out in combination with a single prechamber heating operation as well as in combination with multiple heating operations during the first or multiple engine cycle after engine start request. The number of injections may preferably be in a range of 2 to 5 and most preferable in a range of 2 to 3.

Further, the control unit may trigger the spark plug after each of the multiple injections in order to ignite each injection separately. This procedure may support the flame propagation inside the prechamber and may therefore improve the heating effect.

Preferably, the control unit may activate the prechamber fuel injector not before the fuel pressure exceeds a predetermined value. This allows for a stable spray formation with small droplets and therefore helps to avoid wall wetting inside the prechamber which can cause particle formation. Preferably, the predetermined pressure value may be at least 90% of the maximum injection pressure used at engine operation and most preferable at least 95% of the maximum injection pressure used at engine operation. The fuel pressure for injecting the fuel into the prechamber to perform a prechamber heating operation may preferably be in the range of 5 bar to 250 bar and most preferable in the range of 100 bar to 200 bar.

Further, the claimed subject matter may include a method for controlling the start of an internal combustion engine having at least one cylinder, at least one main combustion chamber, at least one intake port, at least one main fuel injector and/or at least one ignition device configured to ignite an air-fuel-mixture inside the main combustion chamber and at least one control unit, wherein the ignition device may comprise a spark plug, a prechamber fuel injector and a prechamber, connected to the main combustion chamber via at least one orifice (10e) in a prechamber wall (10d), wherein the control unit may control the ignition device to perform a prechamber heating operation by injecting a predetermined amount of fuel into the prechamber and igniting an air-fuel-mixture therein, while the main fuel injector is deactivated during at least a first engine cycle after engine start request.

Further, the claimed subject matter may include a computer program product storable in a memory comprising instructions which, when carried out by a computer or a computing unit, cause the computer to perform the above described method or aspects thereof, as well as a computer-readable [storage] medium comprising instructions which, when executed by a computer, cause the computer to carry out said method or aspects thereof.

Advantageous Effects of Invention

Summarizing, the control unit and the method for controlling the start of an internal combustion engine equipped with an ignition device including a fuel-fed prechamber significantly reduces the particle emissions during the engine start by performing prechamber heating operation. Due to the increased temperature of the prechamber after heating, wall wetting inside the prechamber can be avoided and reactive flame jets can be generated which lead to an improved ignition and combustion of the mixture in the main combustion chamber during the first main combustion cycle.

In the following the claimed subject-matter will be further explained based on at least one preferential example with reference to the attached exemplary and schematic drawings.

BRIEF DESCRIPTION OF DRAWINGS

FIG. 3 (3a-3d) illustrates schematically different control sequences for performing a prechamber heating operation
FIG. 4 depicts a flow chart of the claimed control method.

DESCRIPTION OF EMBODIMENTS

Figure 1:
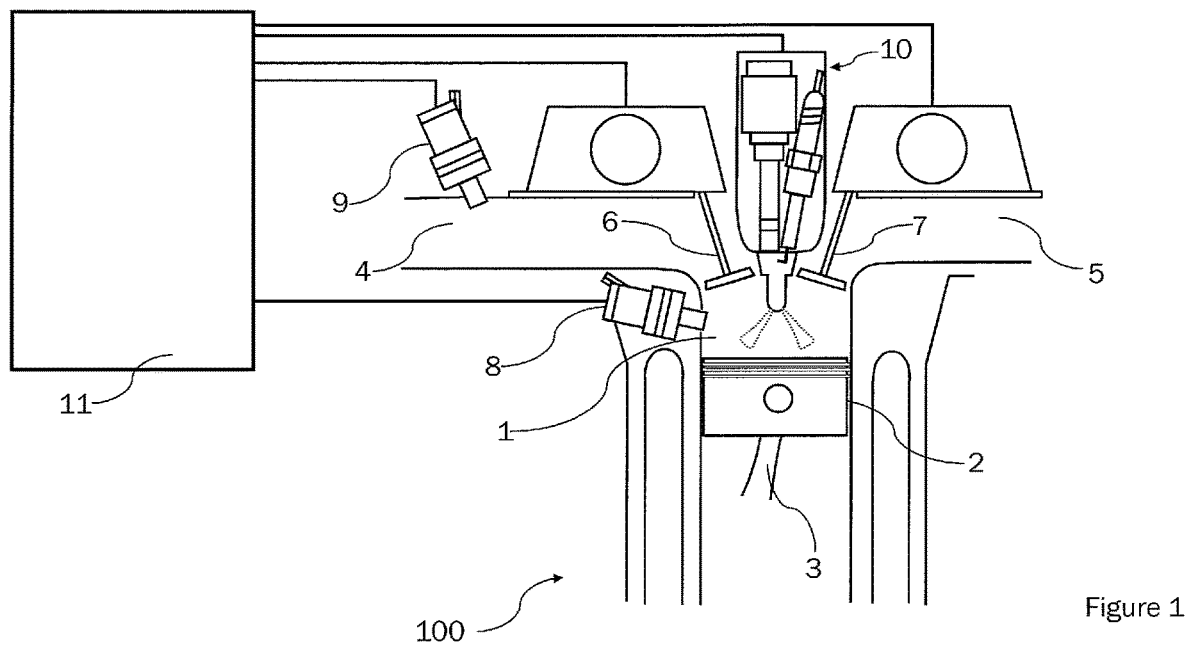
FIG. 1 depicts a schematic view of a cylinder of an internal combustion engine comprising an ignition device having a fuel-fed prechamber.

FIG. 1 shows schematically an exemplary cylinder 100 of an otherwise unspecified internal combustion engine, which may have more than one cylinder 100. The engine may, for example, have two, three, four, six, eight or less/more cylinders 100. The engine comprises at least one piston 2 driven via a connecting rod 3 by a crankshaft (not depicted) for repeated reciprocal movement in the cylinder 100 to define the main combustion chamber therein.

An (air) intake port 4 with an intake valve 6 as well as an exhaust port 5 with an exhaust valve 7 are connected to the main combustion chamber 1. Ambient air is drawn into the main combustion chamber 1 through the intake port 4. Exhaust gases are discharged from the combustion chamber 1 via the exhaust port 5. An ignition device 10 comprising a spark plug 10a, a prechamber fuel injector 10b and a prechamber 10c is attached to the internal combustion engine.

The spark plug 10a of the ignition device 10 may be electrically connected to an ignition coil (not depicted). The spark plug 10a in combination with the ignition coil form the spark ignition device which preferably offers a variable spark duration or multi-spark ignition. The internal combustion engine may have one or more ignition device 10. Preferably, it has at least one ignition device(s) 10 per cylinder 100. The ignition device 10 as well as a direct fuel injector 8, or at least parts thereof, are connected to the inside of the combustion chamber 1 so that reactive jets (depicted in dotted lines) and fuel can be introduced/injected into the main combustion chamber 1. The direct fuel injector 8 may preferably be an electrohydraulic fuel injector or a piezoelectric fuel injector. Additionally, a port fuel injector 9 is connected to the intake port 4 of the cylinder 100. The high-pressure fuel supply of the direct fuel injector 8 and the low-pressure fuel supply of the port fuel injector 9 are not depicted. The main fuel injection may be either performed by the direct main fuel injector 8 or the port main fuel injector 9 or may be divided between both injectors.

A control unit 11 for controlling the ignition device is further shown in FIG. 1. The control unit 11 is electrically connected to the ignition device 10, the direct main fuel injector 8 and/or the port main fuel injector 9 and controls the multiple units/injectors/actuators. The control unit 11 may, for example, be the engine control unit (ECU).

The control unit 11 may also be any other control unit, and signal line connections between the control unit 11 and the controlled units may differ from the example of FIG. 1. For example, there may be a plurality of control units 11 which may control subgroups of the controlled units, e.g. one control unit 11-1 may control only the ignition device 10, another control unit 11-2 may control only fuel injectors 8, 9 and so on. Even further, if there is a plurality of control units 11, these control units 11 may be interconnected with each other hierarchically or in another way. Alternatively, there may be one single control unit 11 which includes all the control functions of the multiple actuators.

Further, pressure sensors which are not shown may be disposed, e.g., in the wall of the combustion chamber 1 so that the pressure within the combustion chamber 1 can be measured. Measuring the pressure within the combustion chamber 1 allows for realizing a feedback combustion control and may also allow to improve the prechamber heating operation by providing additional information regarding the in-cylinder conditions.

Figure 2:
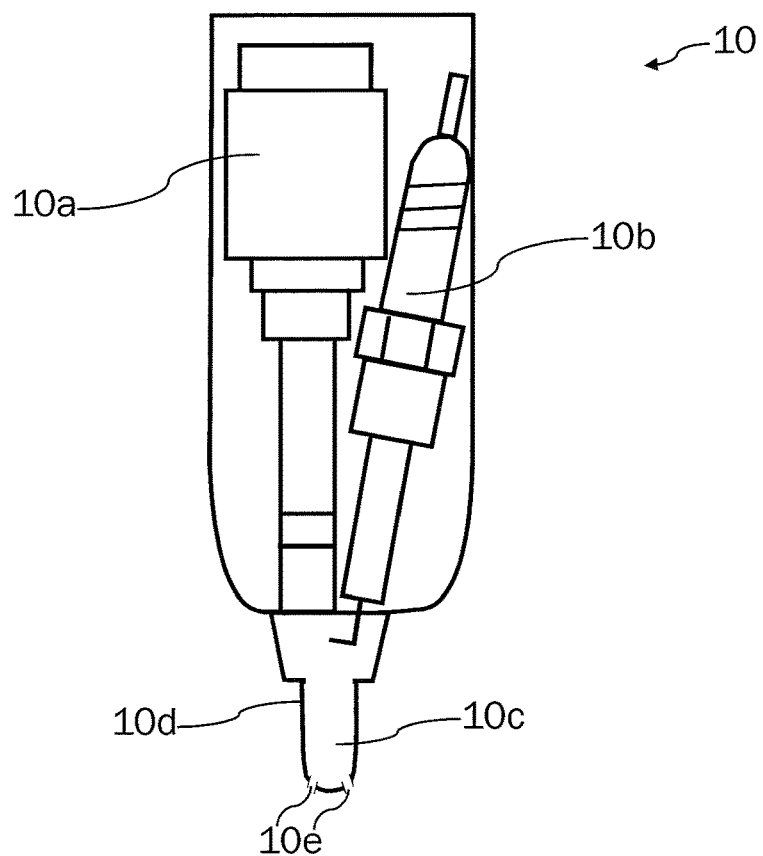
FIG. 2 depicts a schematic view of the ignition device.

In FIG. 2 a schematic view of the ignition device 10 is depicted. The ignition device 10 comprises a fuel injector 10a, a spark plug 10b and a prechamber 10c. The prechamber 10c is divided off the main combustion chamber 1 by a prechamber wall 10d in which orifices 10e are disposed to introduce the reactive jets generated by the prechamber combustion into the main combustion chamber 1. The number, the geometry and the position of the orifices 10e are not limited to the example shown in FIG. 2. The prechamber 10c may comprise a plurality of orifices 10e which are disposed at different positions in the prechamber wall 10d and provided with different diameters. Further, the shape of the prechamber is not limited to the shape shown in FIG. 2 but can be designed in many different shapes, such as hemispherical, conical or cylindrical shapes or combinations thereof. The prechamber injector 10a may be connected to the high-pressure fuel supply or the low-pressure fuel supply of the engine (not depicted) or may be connected to a separate fuel supply (not depicted) in order to inject a different fuel as injected into the main combustion chamber 1. The spark plug 10b may be electrically connected to an ignition coil (not depicted) which may be included into the ignition device 10 or located at another place of the engine remote to the ignition device 10. Preferably, there may be one ignition coil for each ignition device 10 but a single ignition coil for multiple ignition devices 10 may also be possible.

In the FIGS. 3 (3a to 3d) different examples of performing the prechamber heating operation are illustrated.

FIG. 3a shows the most preferable case of performing the prechamber heating operation by controlling the injector to inject a single fuel amount into the prechamber during the compression stroke of a first engine cycle (prechamber heating cycle) and triggering the spark ignition shortly after end of the prechamber injection. In the following combustion cycle the main fuel injector is controlled to inject the main fuel amount into the main combustion chamber or the intake port during the intake stroke and the ignition device is controlled to ignite the air-fuel mixture in the main combustion chamber at the end of the compression stroke by carrying out a prechamber combustion to provide the required ignition energy transported from the prechamber into the main combustion chamber by the reactive jets. The procedure of controlling the injection and the ignition during the second engine cycle (combustion cycle) is the same for all examples shown in the FIGS. 3 (3a to 3d).

The control sequence for performing a prechamber heating operation depicted in FIG. 3b shows a multiple injection wherein the injection period of the prechamber injector shown in FIG. 3a is divided in four very small periods during the compression stroke of the first engine cycle, wherein a single ignition is triggered after the end of the last injection period. FIG. 3c shows a different control sequence for a prechamber heating combustion which also carries out a multiple injection during the compression stroke of the first engine cycle but additionally supports the combustion process by triggering the spark ignition after each of the small injection timings. FIG. 3d illustrates a control sequence for executing multiple prechamber heating operations according to FIG. 3a, wherein the heating operations are carried out during the entire first engine cycle.

The different control sequences can be executed depending on the engine temperature and the temperature of the prechamber wall, respectively, as exemplary explained in the flowchart depicted in FIG. 4.

Therein it is exemplary described that, when the control unit receives an engine start request, it sets a cycle counter to 1 and determines in step S100 the temperature of the prechamber wall $T_{PCW}$ either directly by a temperature sensor or indirectly, for example, by reading a temperature value out of a characteristic curve or map. If the prechamber wall temperature $T_{PCW}$ is higher than the threshold temperature $T_{vap}$ necessary to vaporize the fuel accumulated as wall film on the prechamber wall 10d, no prechamber heating operation will be performed. The threshold temperature $T_{vap}$ may be defined depending on the type of fuel to be injected into the prechamber. For example, in the case of injecting gasoline $T_{vap}$ may preferably be 85° C. and most preferable 90° C.

If the determined prechamber wall temperature $T_{PCW}$ is lower than $T_{vap}$ but higher than a first predetermined temperature threshold $T_{TH1}$, in step S101 a single prechamber heating operation will be performed according to the control sequence depicted in FIG. 3a. The first predetermined threshold temperature $T_{TH1}$ may be in the range of 0° C. to 10° C. If the prechamber wall temperature $T_{vap}$ is lower than the first but higher than a second predetermined threshold temperature $T_{TH2}$, step S102 will be performed, in which the fuel to be injected into the prechamber during the compression stroke is split into multiple small portions, for example in four portions as depicted in FIG. 3b. After the end of the last injection a single spark ignition is triggered by the control unit. The second predetermined threshold temperature $T_{TH2}$ may be in the range of −10° C. to 0° C. If the prechamber wall temperature $T_{PCW}$ is lower than the second but higher than a third predetermined threshold temperature $T_{TH3}$, step S103 will be performed, wherein the fuel is injected in multiple small portions into the prechamber and a spark ignition will be triggered after each injection as depicted in FIG. 3c. The third predetermined threshold temperature $T_{TH3}$ may be defined in the range of −20° C. to −10° C. If the prechamber wall temperature $T_{PCW}$ is lower than the third threshold temperature $T_{TH3}$, step S104 will be performed according to FIG. 3d, wherein multiple prechamber operations are performed during the entire first engine cycle. After finishing the first prechamber heating cycle, the cycle counter is incremented and it is determined whether the executed prechamber heating operation was sufficient to increase the prechamber wall temperature $T_{PCW}$ to a value which exceeds the vaporization temperature $T_{vap}$. If this is the case, the prechamber heating operation will be terminated. If not, the described procedure will be repeated until the prechamber wall temperature $T_{PCW}$ rises above the vaporization temperature $T_{vap}$ or until a maximum number of prechamber heating cycles $c_{max}$ is reached. The maximum number of prechamber heating operation cycles $c_{max}$ may preferably be 5 cycles and most preferable 3 cycles, in order to avoid an undesirable long starting time. In case of the hybrid vehicles, where the other powertrain such as an electric motor can operate the vehicle during the prechamber heating operation cycles, the maximum number of prechamber heating operation cycles can be extended more than 5 times, until the wall temperature of the prechamber exceeds the predetermined temperature. The described procedure ensures that the prechamber is sufficiently preheated before the first main combustion cycle is initiated in order to avoid unwanted particle emissions during engine start.

Features of the different embodiments, aspects and examples, which are described herein and which are shown by the Figures, may be combined either in part or in whole. The herein described invention shall also entail these combinations.

Again summarizing, the present subject-matter offers a control unit and a method for controlling the start of an internal combustion engine equipped with an ignition device comprising a fuel-fed prechamber, wherein a prechamber heating operation is performed which enables a safe starting process even at low engine temperature and significantly reduces the hydrocarbon and particle emissions during engine start.

REFERENCE SIGNS LIST

1: main combustion chamber, 2: piston, 3: connecting rod, 4: intake port, 5: exhaust port, 6: intake valve, 7: exhaust valve, 8: direct main fuel injector, 9: port main fuel injector, 10: ignition device, 10*a*: spark plug, 10*b*: prechamber fuel injector, 10*c*: prechamber, 10*d*: prechamber wall, 10*e*: orifice, 11: control unit, and 100: cylinder.

The invention claimed is:

1. Control unit for controlling the start of an internal combustion engine having at least one cylinder, at least one main combustion chamber, at least one intake port, at least one main fuel injector and at least one ignition device configured to ignite an air-fuel-mixture inside the main combustion chamber,
   wherein the ignition device comprises a spark plug, a prechamber fuel injector and a prechamber, connected to the main combustion chamber via at least one orifice in a prechamber wall,
   wherein the control unit is configured to control the ignition device to perform a prechamber heating operation by injecting a predetermined amount of fuel into the prechamber and igniting an air-fuel-mixture therein, while the main fuel injector is deactivated during at least a first engine cycle after engine start request.

2. Control unit according to claim 1, wherein,
   during a compression stroke of the at least first engine cycle after engine start request,
   the control unit is configured to control the ignition device to perform the prechamber heating operation by activating the prechamber fuel injector to inject the predetermined amount of fuel into the prechamber and subsequently triggering the spark plug to ignite the air-fuel-mixture therein.

3. Control unit according to claim 1, wherein the control unit is configured to control the ignition device to perform multiple prechamber heating operations during at least the first engine cycle after engine start request until the temperature of the prechamber wall exceeds a predetermined temperature.

4. Control unit according to claim 1, wherein the control unit is configured to control the ignition device to perform the prechamber heating operations during multiple engine cycles after engine start request until the temperature of the prechamber wall exceeds a predetermined temperature.

5. Control unit according to claim 1, wherein the control unit is configured to split the predetermined amount of fuel to be injected into the prechamber and to control the prechamber fuel injector to inject it over a plurality of multiple injections.

6. Control unit according to claim 5, wherein the control unit is configured to trigger the spark plug after each of the multiple injections.

7. Control unit according to claim 1, wherein the control unit is configured to activate the prechamber fuel injector not before the fuel pressure exceeds a predetermined value.

8. Method for controlling the start of an internal combustion engine having at least one cylinder, at least one main combustion chamber, at least one intake port, at least one main fuel injector, at least one ignition device configured to ignite an air-fuel-mixture inside the main combustion chamber and at least one control unit,
   wherein the ignition device comprises a spark plug, a prechamber fuel injector and a prechamber, connected to the main combustion chamber via at least one orifice in a prechamber wall,
   wherein the control unit controls the ignition device to perform a prechamber heating operation by injecting a predetermined amount of fuel into the prechamber and igniting an air-fuel-mixture therein, while the main fuel injector is deactivated during at least a first engine cycle after engine start request.

9. Method according to claim 8, wherein,
   during a compression stroke of the at least first engine cycle after engine start request,
   the at least one control unit controls the ignition device to perform a prechamber heating operation by activating the prechamber fuel injector to inject the predetermined amount of fuel into the prechamber and subsequently triggering the spark plug to ignite the air-fuel-mixture therein.

10. Method according to claim 8, wherein the at least one control unit controls the ignition device to perform multiple prechamber heating operations during at least the first engine cycle after engine start request until the temperature of the prechamber wall exceeds a predetermined temperature.

11. Method according to claim 8, wherein the at least one control unit controls the ignition device to perform the prechamber heating operations during multiple engine cycles after engine start request until the wall temperature of the prechamber exceeds a predetermined temperature.

12. Method according to claim 8, wherein the at least one control unit splits the predetermined amount of fuel to be injected into the prechamber and controls the prechamber fuel injector to inject it over a plurality of multiple injections.

13. Method according to claim 12, wherein the at least one control unit triggers the spark plug after each of the multiple injections.

14. Method according to claim 8, wherein the at least one control unit activates the prechamber fuel injector not before the fuel pressure exceeds a predetermined value.

15. Internal combustion engine including the at least one control unit of claim 1.

16. A computer program product storable in a memory comprising instructions which, when carried out by a computer, cause the computer to perform the method according to claim 8.

* * * * *